United States Patent
Fukuda et al.

[11] Patent Number: 5,889,085
[45] Date of Patent: Mar. 30, 1999

[54] INK COMPOSITION AND METHOD FOR RECORDING IMAGE

[75] Inventors: Yuzuru Fukuda; Takeshi Mikami, both of MInami-Ashigara, Japan

[73] Assignee: Fuji Xerox Co., Ltd., Tokyo, Japan

[21] Appl. No.: 883,458

[22] Filed: Jun. 26, 1997

[30] Foreign Application Priority Data

Jul. 5, 1996 [JP] Japan .................................. 8-176882

[51] Int. Cl.$^6$ .................................................. C09D 11/10
[52] U.S. Cl. ........................................... 523/161; 523/160
[58] Field of Search ..................... 523/160, 161

[56] References Cited

U.S. PATENT DOCUMENTS

| | | | |
|---|---|---|---|
| 4,094,685 | 6/1978 | Lester | 260/2.5 |
| 4,711,802 | 12/1987 | Tannenbaum | 524/546 |
| 4,914,146 | 4/1990 | Honda | 524/449 |
| 5,008,042 | 4/1991 | Honda | 252/518 |
| 5,158,606 | 10/1992 | Carlick | 524/548 |
| 5,216,081 | 6/1993 | Mohri | 524/517 |
| 5,416,156 | 5/1995 | Kamen | 524/520 |
| 5,534,049 | 7/1996 | Wallstrom | 524/487 |
| 5,554,217 | 9/1996 | Babler | 523/160 |
| 5,567,747 | 10/1996 | Cappuccio | 523/403 |
| 5,591,796 | 1/1997 | Wisniewski | 524/484 |
| 5,700,582 | 12/1997 | Sargeant | 420/476.6 |
| 5,700,861 | 12/1997 | Tomihashi | 524/64 |

FOREIGN PATENT DOCUMENTS

A-5-255628 10/1993 Japan .
A-6-340835 12/1994 Japan .
B2-7-47355 5/1995 Japan .

*Primary Examiner*—Paul R. Michl
*Attorney, Agent, or Firm*—Oliff & Berridge, PLC

[57] ABSTRACT

The ink composition of the present invention comprises water, colorant and fine particles of a resin containing fluoroolefin units. The fine particles of resin may be preferably fine particles of fluorine-containing vinyl ether resin composed of fluoroolefin units and vinyl ether units represented by the following general formula:

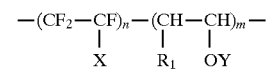

wherein X is selected from the group consisting of F, $CF_3$ and Cl; Y is selected from the group consisting of $R_2$, $R_3OH$ and $R_4COOH$; $R_1$ is a hydrogen atom or an alkyl group having from 1 to 18 carbon atoms; $R_2$ is an alkyl group having from 1 to 18 carbon atoms; $R_3$ and $R_4$ are alkylene groups having from 1 to 18 carbon atoms respectively, n and m are integers, and the ratio of m to n, m/n, is in the range of 1/99 to 99/1. The ink composition of the present invention is able to record an image of high density and superior water resistance with only a small amount of ink.

19 Claims, No Drawings

INK COMPOSITION AND METHOD FOR RECORDING IMAGE

BACKGROUND OF THE INVENTION

1. Field of the Invention

The present invention relates to an ink composition and a method for recording an image, and in particular, to an ink composition comprising water, colorant and fine particles of resin and a method for recording an image using thereof.

2. Description of the Related Art

In recent years, the ink jet printing system has been well known as a recording method suitable as the output unit of information apparatus such as computers, etc., because of its low running costs, high image quality and because the easiness with which color printing can be achieved.

Aqueous dye solutions have conventionally been used in ink jet printing. There are, however, disadvantages. When ink discharged from a nozzle adheres to the surface of recording paper, the ink blots on the paper form dots larger than the particles of discharged ink, or the density of the recorded image is low, as is the image quality. And further, there is also the disadvantage that images tend to blot easily run when wet because of poor water resistance.

In order to solve these problems, (1) an ink composition in which a polyester particle colored with dye or pigment is dispersed, (2) an ink composition comprising an emulsion of non-crosslinked vinyl polymer as the main component, water-soluble polymer, dye or pigment and water, and (3) an ink jet printing method characterized by crosslinking on recording paper an ink composition comprising pigment, water-soluble or water-dispersible polyester or polyamide and crosslinking agent are disclosed in Japanese Patent Application Laid-open (JP-A) Nos. 6-340835 and 5-255628 and Japanese Patent Application Publication (JP-B) No. 7-47355, respectively.

However, the ink compositions disclosed in Japanese Patent Application Laid-open (JP-A) Nos. 6-340835 and 5-255628 cannot completely prevent ink blotting caused by capillary action of recording paper fibers or stop the ink from seeping into the recording paper. Thus, image density and water resistance are limited.

However, with the ink jet printing method described in Japanese Patent Application Publication (JP-B) No. 7-47355 the image layer was crosslinked and so image density was enhanced somewhat effectively. There were, however, concerns in the ink jet printing method described in Japanese Patent Application Publication (JP-B) No. 7-47355 for the stability of the ink since the crosslinking agent added is a reactive substance.

Since, in the inventions described in Japanese Patent Application Laid-open (JP-A) Nos. 6-340835 and 5-255628 and Japanese Patent Application Publication (JP-B) No.7-47355, the concentration of the solid content of resin in the ink composition is restricted to less than about 30% for production reasons and by physical properties, high image density could not be obtained without increasing the amount of ink per unit area of recording paper. Therefore, high image density could not be obtained with inkdrops of small diameter, i.e., with ink drops in small amounts required for realizing high image quality and high resolving power.

SUMMARY OF THE INVENTION

An object of the present invention is to provide (a) an ink composition, making use of inkdrops of small diameter in small amounts capable high image quality and high image density and (b) a method for recording an image using the ink composition. Another object of this invention is to provide an ink composition capable of forming an image of high image density and excellent water resistance, which ink composition does not blot on recording paper and a method for recording images using the ink composition. A further object of this invention is to provide a stable ink composition and a method for recording images using the ink composition.

The ink of the present invention comprises water, colorant and fine particles of resin, said fine particle of resin being characterized by fluororesin particles containing fluoroolefin units.

As herein used, said fine particles of resin may be defined as fine particles of fluorine-containing vinyl ether resin composed of fluoroolefin units and vinylether units represented by the following general formula:

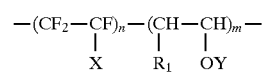

wherein X is selected from the group consisting of F, $CF_3$, and Cl; Y is selected from the group consisting of $R_2$, $R_3OH$, and $R_4COOH$; $R_1$ is a hydrogen or alkyl group having from 1 to 18 carbon atoms; $R_3$ and $R_4$ are alkylene groups having from 1 to 18 carbon atoms, respectively; n and m are integers and the ratio of m to n, m/n, is in the range of from 1/99 to 99/1.

The present invention is also characterized by using the ink composition mentioned above in a method of recording an image by means of discharging inkdrops of the ink composition from a head to record an image on a recording medium.

DESCRIPTION OF THE PREFERRED EMBODIMENTS

According to the present invention, immediately after the ink adheres to the recording paper, water evaporates or penetrates into the recording paper. Because of this, the fluoroolefin unit containing fluororesin fine particles undergo contact, diffusion and fusion. By this mechanism, a colored image layer can be formed made up mainly of compact fluororesin in which the colorant is confined.

Since the present invention makes use of the fine particles of fluororesin containing fluoroolefin units, the concentration of the solid content of the resin may be increased to about 50% and, as a result, a large amount of solid content of resin can be contained in one inkdrop. Since the solid content of resin is a basic constituent making up the image, extremely high image density can be obtained by printing with a small amount of ink for the reason that the ink composition of this invention forms an image layer on the recording paper according to the mechanism stated above. That is to say, high image density can be obtained by making use of a small amount of inkdrop of small diameter. Printing of quality and with resolving power of from 600 to more than 1200 dpi is made possible. The reason why the concentration of solid content of resin can be increased up to about 50% may be because the fine particles of the aforesaid polyester can dissolve in water to a certain extent; this level increases with an increase in the concentration of the solid content of resin, but the viscosity rapidly increases at the same time. As a result, it is impossible to keep the properties (viscosity) stable when the concentration of the solid content of resin is more than about 30%. On the contrary, the fine particles of fluororesin containing fluoroolefin units do not dissolve in water and the viscosity of the ink composition does not significantly increase even if the concentration of the solid content of resin is increased. Consequently, it is possible to increase the concentration of the solid content of resin to 50% while maintaining stability.

As stated above, blotting of ink composition can be prevented and an image of high image quality and good water resistance can be formed on the recording paper through the combined properties of good water repellency, excellent weatherability and high water resistance inherent in the fluororesin.

The ink composition of the present invention comprises water, colorant and fine particles of fluororesin, said fluororesin contained in the ink composition having fluoroolefin units. A fluorine-containing vinyl ether resin composed of fluoroolefin units and vinyl ether units represented by the general formula below, may be preferable as the resin of fine particle of fluororesin having fluoroolefin units because of easily forming uniform layer.

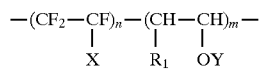

$$-(CF_2-CF)_n-(CH-CH)_m-$$
$$\phantom{-(CF_2-CF)_n-}|\phantom{xx}|\phantom{xx}|$$
$$\phantom{-(CF_2-CF)_n-}X\phantom{xx}R_1\phantom{xx}OY$$

wherein X is selected from the group consisting of F, $CF_3$, and Cl; Y is selected from the group consisting of $R_2$, $R_3OH$, and $R_4COOH$; $R_1$ is a hydrogen or alkyl group having from 1 to 18 carbon atoms, respectively; $R_3$ and $R_4$ are, alkylene groups having from 1 to 18 carbon atoms; n and m are integers and the ratio of m to n, m/n, is in the range of from 1/99 to 99/1.

The fluoroolefin unit may be selected from the group consisting of $-CF_2-CF_2-$, $-CF_2CF(CH_3)-$, $-CF_2CFCl-$ and $-CF_2CF(CF_3)-$, and more preferably $-CF_2CF(CF_3)-$. The fluoroolefin unit may be one or more of these used alone, or in combination.

The alkyl group in the vinyl ether unit of fluororesin, may be a straight chain or a branched chain. Examples of alkyl groups useful herein include methyl group, ethyl group, propyl group, isopropyl group, butyl group, isobutyl group, t-butyl group, pentyl group, isopentyl group, t-pentyl group. Examples of alkylene groups useful herein include the following:

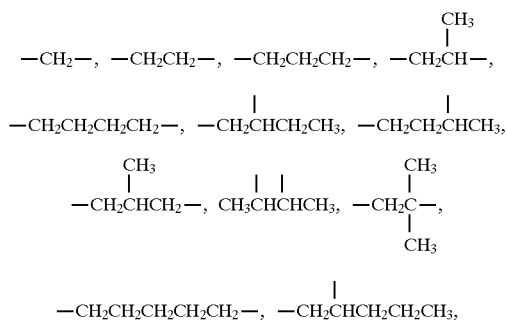

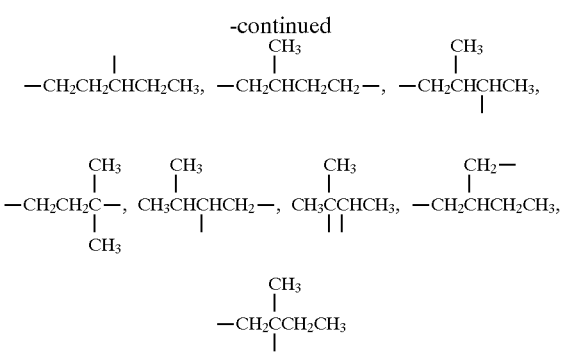

Preferred examples of vinyl ether units include the following:

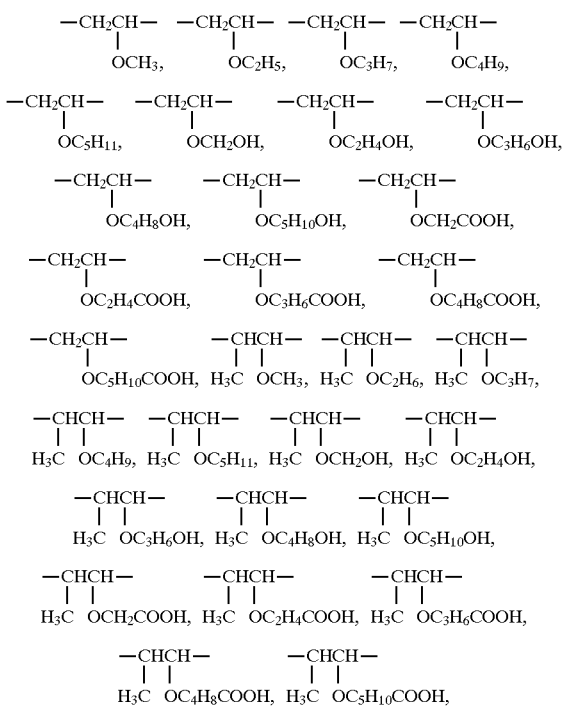

The vinyl ether unit in the fluororesin may be one of those mentioned above or used in combination thereof, but is preferably used in combination with different vinyletherunits, more preferably used in combination with three kinds of vinyl ether units wherein Y is $R_2$, $R_3OH$, or $R_4COOH$.

The fluororesin is preferably an alternating copolymer in which the fluoroolefin unit and vinyl ether unit are arranged alternately.

Examples of the preferred compounds of fluororesin for use herein include the following:

$$-(CF_2CF)-(CHCH)-(CF_2CF)-(CH_2CH)-(CF_2CF)-(CH_2CH)-(CF_2CF)-(CH_2CH)- \quad \text{[Compound 1]}$$
$$\begin{array}{cccccc} | & | & | & | & | & | \\ CF_3 & CH_3 & CF_3 & CF_3 & CF_3 & CF_3 \\ & OCH_3 & & OCH_3 & & OCH_2OH \quad OCH_2COOH \end{array}$$

[Compound 1]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OCH$_3$    OCH$_3$    OCH$_2$OH   OCH$_2$COOH

[Compound 2]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OC$_2$H$_5$   OCH$_3$    OCH$_2$OH   OCH$_2$COOH

[Compound 3]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OCH$_3$    OC$_2$H$_5$   OCH$_2$OH   OCH$_2$COOH

[Compound 4]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OCH$_3$    OCH$_3$    OC$_2$H$_4$OH  OCH$_2$COOH

[Compound 5]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OCH$_3$    OCH$_3$    OCH$_2$OH   OC$_2$H$_4$COOH

[Compound 6]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OC$_2$H$_5$   OC$_2$H$_5$   OCH$_2$OH   OCH$_2$COOH

[Compound 7]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OC$_2$H$_5$   OCH$_3$    OC$_2$H$_4$OH  OCH$_2$COOH

[Compound 8]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OC$_2$H$_5$   OCH$_3$    OCH$_2$OH   OC$_2$H$_4$COOH

[Compound 9]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OCH$_3$    OC$_2$H$_5$   OC$_2$H$_4$OH  OCH$_2$COOH

[Compound 10]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OCH$_3$    OC$_2$H$_5$   OCH$_2$OH   OC$_2$H$_4$COOH

[Compound 11]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OCH$_3$    OCH$_3$    OC$_2$H$_4$OH  OC$_2$H$_4$COOH

[Compound 12]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OC$_2$H$_5$   OC$_2$H$_5$   OC$_2$H$_4$OH  OCH$_2$COOH

[Compound 13]
—(CF$_2$CF)—(CHCH)—(CF$_2$CF)—(CH$_2$CH)—(CF$_2$CF)—(CH$_2$CH)—(CF$_2$CF)—(CH$_2$CH)—
 |     |         |         |         |
 CF$_3$  OC$_2$H$_5$   OC$_2$H$_4$   OC$_2$H$_4$OH  OC$_2$H$_4$COOH (Note: each backbone unit carries the substituents CH$_3$, CF$_3$, CF$_3$, CF$_3$, CF$_3$ on the upper positions as shown for Compound 1.)

The fine particle of fluororesin may be produced by emulsion-polymerization or dispersion-polymerization of fluoroolefin units (monomer) and vinyl ether units (monomer) The weight-average molecular weight is in the range of from 2,000 to 500,000, preferably in the range of from 3,000 to 300,000.

The average particle diameter of fluororesin is preferably more than 0.01 μm and less than 3 μm, more preferably more than 0.05 μm and less than 1 μm. When the average particle diameter of fluororesin is less than 0.01 μm, layer-forming characteristics are poor, while optical density is decreased when the average particle diameter is more than 3 μm.

The content of fine particles of fluororesin may be preferably in the range of 1 to 95% by weight, and more preferably in the range of 5 to 90% by weight of the total weight of ink composition. A weight percentage between 20% and 80% is most preferable. When said content is less than 1% by weight, the optical density of the image decreases, while there is a fear of a decrease in discharge stability, when the fluororesin particle content exceeds 95% by weight. It is also preferable that the fine particles of fluororesin are homogeneously dispersed in the ink composition.

The colorant used in the ink composition herein may be one of a pigment, a water-soluble dye and a disperse dye. Those which have affinity with water as the main solvent or those that can be dispersed homogeneously in combination with a dispersant can be used.

The pigment used herein may be an organic pigment, or an inorganic pigment, etc., For example, in black and white copying, carbon black (C. I. Pigment Black 7) type such as furnace black, channel black, etc., organic pigments such as and aniline black (C. I. Pigment Black 1) can be used. In color copying, C. I. Pigment Yellow 1, 3, 12, 13, 14, 17, 24, 34, 35, 37, 42, 53, 55, 81, 83, 95, 97, 98, 100, 101, 104, 108, 109, 110, 117, 120, 138, 153, C. I. Pigment Violet 1, 3, 5:1, 16, 19, 23, 38, C. I. Pigment Blue 1, 2, 15, 15:1, 15:2, 15:3, 15:4, 15:6, 16, etc. can be used. The amount of pigment to be added may be preferably in the range of 1 to 50% by weight, and more preferably 1.5 to 30% by weight of the total weight of ink. In order to disperse the pigment homogeneously, dispersant may be preferably added, if necessary, in the range of 0.01 to 10 parts by weight to 100 parts of pigment. The dispersing treatment may be preferably carried out by means of, for example, a ball mill, etc. In the case of mixing the pigment with the aforesaid fine particles of fluororesin, it is preferable to prepare a pigment dispersion previously and to mix said pigment dispersion with a dispersion of fine particles of fluororesin.

The water soluble dye utilizable herein may be a direct dye or an acid dye, such as C. I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199; C. I. Pigment Violet 7, 9, 47, 48, 51, 66, 90, 93, 94, 95, 98, 100, 101; C. I. Direct Yellow 8, 9, 11, 12, 27, 29, 33, 35, 39, 41, 44, 50, 53, 58, 59, 68, 86, 87, 93, 95, 96, 98, 100, 106, 108, 109, 110, 130, 132, 144, 161, 163; C. I. Direct Blue 1, 10, 15, 22, 25, 55, 67, 68, 71, 76, 77, 78, 80, 84, 86, 87, 90, 98, 106, 201, 202, 244, 251, 280; C. I. Acid Black 7, 24, 29, 48; C. I. Acid Violet 5, 34, 43, 47, 48, 90, 103; C. I. Acid Yellow 17, 19, 23, 25, 39, 40, 44, 49, 50, 61, 110, 174, 218; C. I. Acid Blue 9, 25, 40, 41, 62, 72, 76, 80, 106, 112, 120, 205, 230, 271, 280, and others not listed here. The amount of addition of the dye may be determined depending on the kind of dye, the kind of solvent component, characteristics demanded of the ink, etc., but may be usually in the range of 0.2 to 30%, and, preferably, 0.5 to 15% by weight of the total weight of ink by weight.

A layer-forming auxiliary may be added, if necessary. By addition the layer-forming auxiliary, a fusion of the resin fine particles can be accelerated and the formation of image layer may be speeded up. TEXANOL (trade name, available from NAGASE SANGYO Co., Ltd., chemical formula: $C_{12}H_{24}O_3$), and the like can be used as the layer-forming auxiliary.

In addition to the components mentioned above, a pH-adjuster such as potassium dihydrogenphosphate, or sodium dihydrogenphosphate, etc., or an antifungal agent, an antiseptic agent, an anti-corrosive agent, etc. such as benzoic acid, dichlorophene, hexachlorophene, sorbic acid, etc., can be added to the ink if required.

Ethylene glycol, glycerin, and various kinds of polyhydric alcohol and the like may be added to the ink to prevent the nozzle from clogging.

The ink composition of the present invention is suitable for an image recording system operating by discharging inkdrops of the ink composition onto a recording medium via an ink head.

EXAMPLES

While the present invention is described with reference to Examples, it should be understood that the present invention is not limited to the specific examples given but can be modified in various ways without departing from the spirit of the invention.

Example 1

The ink was prepared in the following manner. 20 parts by weight of colorant dispersion (solid content=35%) containing water, copper phthalocyanine pigment (Pigment Blue 15:3) and a dispersant were dispersed by means of a ball mill. A microscope was used to confirm that the colorant particles were in a state of monodispersion. Then 74 parts by weight of resin dispersion (solid content=50%) containing fine particles of fluororesin (Compound Example 1; alternating copolymer, Mw=20,000, average particle diameter= 0.15 $\mu$m) prepared by emulsion polymerization of fluoroolefin and vinyl ether, and water were added and stirred homogeneously. Subsequently, preservatives and other additives were added to the dispersion, and, after confirmation of complete dissolution of the additives, the dispersion obtained was filtered through a membrane filter having pores of 10 $\mu$m in diameter to remove impurities and coarse particles. The concentration of pigment (colorant) in ink {=solid content of pigment×100/total weight of ink (liquid)} was 7.4% by weight, and the concentration of pigment (colorant) in solid content {=solid content of pigment×100/ (solid content of pigment+solid content of resin) } was 16% by weight. The resin content in the ink composition was 39% by weight.

The ink composition thus prepared was applied by means of a bar coater onto normal paper used for photocopying and dried at room temperature to obtain a solid image composed of the coat of the dried layer. In this case, several solid images of different layer thickness (thickness of image) were obtained by changing the coating bar of the bar coater (roughness of coating surface). The optical densities of the images obtained were measured from the image surface side. The results showed that the optical density formed by applying the extremely small amount of 0.7 mg per 1 cm$^2$ of ink was high, that is, 1.6.

Next, the image obtained on the paper was observed visually from the back of the paper (opposite side to the surface of image) to confirm very little no penetration of ink through the back paper. Then, the optical density of the image on the paper was measured from the back of the paper. The optical density was found to be 0.15, largely the same as that of the paper itself. From the optical density measurement, it was confirmed that the ink composition scarcely penetrated the paper.

The profile of the solid image on the paper was observed under am optical microscope. It was found that the solid image was formed mainly on the surface of the paper and the ink composition did not penetrate the paper.

And further, the optical density of the image formed by increasing the applied ink composition to 2.1 mg per 1 cm$^2$ was 1.9. From these facts, it can be seen that extremely high optical density (1.9) was obtained with an extremely small amount of ink (2.1 mg/cm$^2$)and that this optical density increased with an increase in the amount of ink used.

Next, the droplets of ink composition were sprayed over the paper to form small image dots thereon. These dots thus formed were observed by magnifying glass and optical microscope. It was found that distinct dots of high image density were formed and that there was no bleeding around the dots.

Subsequently, water was spilled on the surface of a solid image formed by means of bar coater and the small image dots, respectively, to evaluate water resistance. It was observed that neither blotting of images nor spreading of colorants occurred. The ink composition of this example was confirmed to have high water resistance. In order to evaluate the water resistance under stricter conditions, the solid image formed by bar coater, and the small image dots were immersed in distilled water for 40 hours. It was observed that neither elution of colorant into the water nor blotting or spreading of colorant on the image occurred. This confirms the high water resistance of the ink composition of this example.

Example 2

Ink was prepared in the following manner. To 50 parts by weight of aqueous colorant solution (solid content=10%) containing water and phthalocyanine dye (Acid Blue 9) were added 53 parts by weight of resin dispersion (solid content=50%) containing fine particles of fluororesin (Compound Example 2; alternating copolymer, Mw=20,000, average particle diameter=0.15 $\mu$m) prepared by emulsion-polymerization of water, fluoroolefin and vinyl ether, and stirred homogeneously. Subsequently, preservatives and other additives were added to the dispersion, and, after confirmation of complete dissolution of the additives, the dispersion thus obtained was filtered through a membrane filter having pores of 10 $\mu$m in diameter to remove impurities and coarse particles. The concentration of dye (colorant)in ink {=solid content of dye×100/total weight of ink (liquid)} was 4.9% by weight, and the concentration of dye (colorant) in solid content {=solid content of dye×100/(solid content of dye+solid content of resin)} was 16% by weight. The resin content in the ink composition was 26% by weight.

The ink composition thus prepared was applied by means of a bar coater onto normal paper used for photocopying and dried at room temperature to obtain a solid image composed of the coat of the dried layer. In this case, several solid images of different layer thickness (thickness of image) were obtained by changing the type of coating bar of the bar coater. The optical densities of the images obtained were measured from the image surface side. The results showed that the optical density formed by applying an extremely small amount of 0.7 mg per 1 cm$^2$ of ink was high, that is, 1.8.

Next, the image obtained on the paper was observed visually from the back of the paper to confirm very little penetration of ink through the paper. Then, the optical density of the image on the paper was measured from the back of the paper. The optical density was found to be 0.15 largely the same as that of the paper itself. From the optical density measurement, it was confirmed that the ink composition scarcely penetrated the paper.

The profile of the solid image on the paper was observed under an optical microscope. It was found that the solid image was formed mainly on the surface of the paper and the ink composition did not penetrate the paper.

And further, the optical density of an image formed by increasing the applied ink composition to 2.1 mg per 1 cm$^2$ was 2.0. From these facts, it can be seen that extremely high optical density (2.0) was obtained with an extremely small amount of ink (2.1 mg/cm$^2$) and that this optical density increased with an increase in the amount of ink used.

Next, the droplets of ink composition were sprayed over the paper to form small image dots thereon. The dots thus formed were observed by magnifying glass and optical microscope. It was found that distinct dots of high image density were formed and that there was no bleeding around the dots.

Subsequently, water was spilled on the surface of a solid image formed by means of bar coater and the small image dots, respectively, to evaluate water resistance. It was observed that neither blotting of images nor spreading of colorants occurred. The ink composition of this example was confirmed to have high water resistance. In order to evaluate the water resistance under stricter conditions, the solid image formed by bar coater and the small image dots were immersed in distilled water for 40 hours. It was observed that neither elution of colorant into the water nor blotting or spreading of colorant on the image occurred. This confirms the high water resistance of the ink composition of this example.

Example 3

Ink was prepared in the following manner. 20 parts by weight of colorant dispersion (solid content=35%) containing water, copper phthalocyanine pigment (Pigment Blue 15:3) and a dispersant were dispersed by means of a ball mill. A microscope was used to confirm that the colorant particles were in a state of monodispersion. Then 7 parts by weight of 2,2,4-trimethyl-1,3-pentanediol-mono-(2-methylpropanate) (chemical formula; $C_{12}H_{24}O_3$) as a layer-forming auxiliary and 74 parts by weight of resin dispersion (solid content=50%) containing fine particles of fluororesin (Compound Example 1; alternating copolymer, Mw=20,000, average particle diameter=0.15 $\mu$m) prepared by emulsion-polymerization of fluoroolefin and vinyl ether, and water were added and stirred homogeneously. Subsequently, preservatives and other additives were added to the dispersion, and, after confirmation of complete dissolution of the additives, the dispersion obtained was filtered through a membrane filter having pores of 10 $\mu$m in diameter to remove impurities and coarse particles. The concentration of pigment (colorant) in ink {=solid content of pigment×100/total weight of ink (liquid)} was 6.9% by weight, and the concentration of pigment (colorant) in solid content {=solid content of pigment×100/(solid content of pigment+solid content of resin) } was 16% by weight. The resin content in the ink composition was 37% by weight.

The ink composition thus prepared was applied by means of a bar coater onto normal paper used for photocopying and dried at room temperature to obtain a solid image composed of the coat of the dried layer. In this case, several solid images of different layer thickness (thickness of image) were obtained by changing the type of coating bar of the bar coater. The optical densities of the images obtained were measured from the image surface side. The results showed that the optical density formed by applying the extremely small amount of 0.7 mg per 1 cm$^2$ of ink was high, that is, 1.7.

Next, the image obtained on the paper was observed visually from the back of the paper to confirm very little penetration of ink through the paper. Then, the optical density of the image on the paper was measured from the back of the paper. The optical density was found to be 0.15 largely the same as that of the paper itself. From the optical density measurement, it was confirmed that the ink composition scarcely penetrated the paper.

The profile of the solid image on the paper was observed under an optical microscope. It was found that the solid image was formed mainly on the surface of the paper and the ink composition did not penetrate the paper.

And further, the optical density of the image formed by increasing the applied ink composition to 2.1 mg per 1 cm$^2$ was 2.0. From these facts, it can be seen that extremely high optical density (2.0) was obtained with an extremely small amount of ink (2.1 mg/cm$^2$) and that this optical density increased with an increase in the amount of ink used.

Next, the droplets of ink composition were sprayed over the paper to form small image dots thereon. The dots thus formed were observed by magnifying glass and optical microscope. It was found that distinct dots of high image density were formed and that there was no bleeding around the dots.

Subsequently, water was spilled on the surface of a solid image formed by means of bar coater and the small image dots, respectively, to evaluate water resistance. It was observed that neither blotting of images nor spreading of colorants occurred. The ink composition of this example was confirmed to have high water resistance. In order to evaluate the water resistance under stricter conditions, the solid image formed by bar coater and the small image dots were immersed in distilled water for 40 hours. It was observed that neither elution of colorant into the water nor blotting or spreading of colorant on the image occurred. This confirms the high water resistance of the ink composition of this example.

Comparative Example 1

An ink composition was prepared by dissolving 10 parts by weight of phthalocyanine dye (Acid Blue-9, solid powder) as colorant and 0.2 parts by weight of surfactant (for preventing the dye applied to normal paper from aggregating) in 90 parts by weight of distilled water. The concentration of the dye in the ink was 10% by weight.

The ink composition prepared in this way was applied by means of a bar coater in the same manner as in Examples 1 to 3 to normal photocopying paper, and dried at room temperature to obtain a solid image formed of the coat of the dried layer. In this case, several solid images of different layer thickness were obtained by changing the type of coating bar of the bar coater. The optical densities of the images obtained were measured from the image surface side. It was found that the optical density formed by applying ink at 0.7 mg per 1 cm$^2$ was 1.2. High optical density could not be obtained by applying such a small amount of ink (0.7 mg/cm$^2$) to normal photocopying paper.

Next, the image obtained on the paper was observed visually from the back of the paper. Significant penetration of the ink composition to the back of the paper was observed. And then, the optical density of the image formed on the paper was measured from the back of the paper. The measured optical density was 0.9 close to 1.2, the value obtained for the surface of the image. From the value, it can be seen that the ink penetrates the paper.

The profile of the solid image on the paper was observed under an optical microscope. It was found that the solid image was formed in the normal paper and that the ink composition penetrated the paper.

And further, the optical density of the image formed by applying an increased amount of ink composition at 2.1 mg per 1 cm$^2$ was still low, that is, 1.3. It was found that the optical density hardly increased even if the amount of ink applied was increased. This means also that the optical density can hardly increase, even if printing is carried out by superposing ink onto ink. From these facts, it can be seen that optical density in Comparative Example 1 can not be increased with the ink composition.

Next, the droplets of ink composition of Comparative Example 1 were sprayed over the paper to form small image dots thereon. The dots thus formed were observed by magnifying glass and optical microscope. It was found that ink smudged around the dots and that blurred dots of low optical density were formed.

Subsequently, water was spilled on the surface of a solid image formed by means of bar coater and the small image dots respectively, to evaluate water resistance. It was observed that, blotting of image and spreading of colorant by the water occurred. The water resistance of the ink composition of this Comparative Example 1 was found to be low. In order to evaluate the water resistance under stricter conditions, the solid image formed by bar coater and the small image dots were immersed in distilled water for 40 hours. It was observed that significant elution of colorant into water occurred, and that the water resistance of the ink composition of this Comparative Example is low.

Comparative Example 2

Ink was prepared in the following manner. 13 parts by weight of colorant dispersion (solid content=35%) containing water, copper phthalocyanine pigment (Pigment Blue 15:3) and a dispersant were dispersed by means of a ball mill. It was confirmed by microscope that the colorant particles were in a state of monodispersion. 80 parts by weight of resin dispersion (solid content=30%) containing fine particles of polyester resin (Mw=20,000, average particle diameter=0.15 $\mu$m) and water, were added and the whole stirred homogeneously. Subsequently, a preservative and other additives were added to the dispersion. After confirming the complete dissolution of these additives, the dispersion obtained was filtered through a membrane filter having pores of 10 $\mu$m in diameter to remove impurities and coarse particles. An ink composition in which the concentration of pigment (colorant) in ink (=solid content of pigment×100/total weight of ink (liquid) was 4.9% by weight, the concentration of pigment (colorant) in solid content {=solid content of pigment×100/(solid content of pigment+solid content of resin) } was 16% by weight, and content of resin in the ink composition was 26% by weight was obtained.

The ink composition prepared in this way was applied by means of a bar coater onto normal photocopying paper and dried at room temperature to obtain a solid image formed of the coat of the dried layer. In this case, several solid images of different layer thickness were obtained by changing the coating bar of the bar coater. The optical density of the image obtained was measured from the surface of the image. The results showed that the optical density of the solid image formed by applying ink (0.7 mg per 1 cm$^2$) was 1.3. That is, high optical density could not be obtained by applying a small amount of ink (0.7 mg/cm$^2$) to the paper.

Next, the image obtained on the paper was observed visually from the back of the paper. Slight penetration of ink composition into the back of the paper was observed. The optical density of the image formed on the paper was next observed from the back of the paper. The optical density was 0.17, a value higher than that of the paper itself.

The profile of the solid image on the paper was observed under an optical microscope. It was found that the ink composition penetrated partially into the paper.

And further, the optical density of an image formed by applying an increased amount of ink composition (2.1 mg per 1 cm$^2$) was 1.7.

Next, droplets of the ink composition of Comparative Example 2 were sprayed onto paper to form small image dots thereon. The dots were observed by magnifying glass and optical microscope. It was found that while there was no blotting of ink around the dots, dots of low optical density were formed.

Subsequently, the solid image formed by bar coater, and the small image dots were immersed in distilled water for 40 hours. Blots of colorant were partially found on the image.

Comparing this Comparative Example 2 with Examples 1 to 3, it can be seen that in Examples 1 to 3 using a fluororesin containing as the resin fluoroolefin units and vinylester units, images of high density and high water resistance were formed with a small amount of ink.

Since the present invention contains fine particles of fluororesin having fluoroolefin units, an image of extremely high density and high water resistance can be formed while printing with inkdrops of small diameter and in small amounts.

And further, since the present invention makes use of an ink composition containing fine particles of fluororesin having fluoroolefin units, a method can be provided for recording an image of extremely high density and high water resistance by printing with inkdrops of small diameters in small amounts.

What is claimed is:

1. An ink comprising water colorant and fine particles of resin, wherein said fine particles of resin are fine particles of fluorine-containing vinyl ether resin consisting of fluoroolefin units and vinyl ether units, represented by the following general formula:

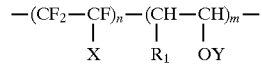

wherein X is selected from the group consisting of F, CF$_3$, and Cl; Y is selected from the group consisting of R$_2$, R$_3$OH and R$_4$COOH; R$_1$ is a hydrogen atom or an alkyl group having from 1 to 18 carbon atoms; R$_2$ is an alkyl group having from 1 to 18 carbon atoms; R$_3$ and R$_4$ are alkylene groups having from 1 to 18 carbon atoms respectively, n and m are integers, and the ratio of m to n, m/n, is in the range of 1/99 to 99/1.

2. An ink composition according to claim 1 wherein the average particle diameter of said fine particles of resin is in the range of 0.01 to 3 μm.

3. An ink composition according to claim 2 wherein the content level of said fine particles of resin is in the range of 1 to 95% by weight.

4. An ink composition according to claim 2 wherein said colorant is a pigment.

5. An ink composition according to claim 3 wherein said colorant is a pigment.

6. An ink composition according to claim 2 wherein said colorant is a water-soluble dye.

7. An ink composition according to claim 3 wherein said colorant is a water-soluble dye.

8. An ink composition according to claim 5 wherein said ink composition further contains a layer-forming auxiliary.

9. An ink composition according to claim 7 wherein said ink composition further contains a layer-forming auxiliary.

10. An ink composition according to claim 2 wherein the weight-average molecular weight of the resin of said fine particles of resin is in the range of 2,000 to 500,000.

11. An ink composition according to claim 3 wherein the weight-average molecular weight of the resin of said fine particles of resin is in the range of 2,000 to 500,000.

12. An ink composition according to claim 5 wherein the content of said pigment is in the range of from 1 to 50% by weight.

13. An ink composition according to claim 5 wherein the content of said water-soluble dye is in the range of from 0.2 to 30% by weight.

14. A method for recording an image on a recording medium by discharging from a head an ink composition comprising water, colorant and fine particles of resin, wherein said fine particles of resin are fine particles of fluorine-containing vinyl ether resin consisting essentially of fluoroolefin units and vinyl ether units, represented by the following general formula:

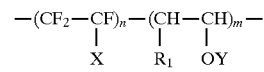

wherein X is selected from the group consisting of F, CF$_3$ and Cl; Y is selected from the group consisting of R$_2$, R$_3$OH and R$_4$COOH; R$_1$ is a hydrogen atom or an alkyl group having from 1 to 18 carbon atoms; R$_2$ is an alkyl group having from 1 to 18 carbon atoms; R$_3$ and R$_4$ are alkylene groups having from 1 to 18 carbon atoms respectively, n and m are integers, and the ratio of m to n, m/n, is in the range of from 1/99 to 99/1.

15. A method for recording an image on a recording medium according to claim 14 wherein the average particle diameter of said fine particles of resin is in the range of from 0.01 to 3 μm.

16. A method for recording an image on a recording medium according to claim 15 wherein the content of said fine particles of resin is in the range of from 1 to 95% by weight.

17. A method for recording an image on a recording medium according to claim 16 wherein said colorant is a pigment.

18. A method for recording an image on a recording medium according to claim 16 wherein said colorant is a water-soluble dye.

19. A method for recoding an image on a recording medium according to claim 14, wherein said fine particle of resin are fine particles of fluorine-containing vinyl ether resin consisting of fluoroolefin units and vinyl ether units, represented by said general formula.

* * * * *